United States Patent
Kydd

(10) Patent No.: US 10,693,315 B2
(45) Date of Patent: Jun. 23, 2020

(54) NON GRID-TIED VEHICLE-SOLAR UNINTERRUPTABLE POWER SYSTEM

(71) Applicant: Paul Harriman Kydd, Lawrenceville, NJ (US)

(72) Inventor: Paul Harriman Kydd, Lawrenceville, NJ (US)

( * ) Notice: Subject to any disclaimer, the term of this patent is extended or adjusted under 35 U.S.C. 154(b) by 43 days.

(21) Appl. No.: 16/055,972

(22) Filed: Aug. 6, 2018

(65) Prior Publication Data

US 2020/0044480 A1    Feb. 6, 2020

(51) Int. Cl.

| | |
|---|---|
| *H02J 9/06* | (2006.01) |
| *H02J 7/35* | (2006.01) |
| *H02J 3/38* | (2006.01) |
| *H02S 40/38* | (2014.01) |
| *H02M 7/44* | (2006.01) |

(52) U.S. Cl.
CPC .............. *H02J 9/062* (2013.01); *H02J 3/383* (2013.01); *H02J 7/35* (2013.01); *H02S 40/38* (2014.12); *H02M 7/44* (2013.01)

(58) Field of Classification Search
CPC ... H02J 9/062; H02J 3/383; H02J 7/35; H02S 40/38; H02M 7/44
See application file for complete search history.

(56) References Cited

U.S. PATENT DOCUMENTS

| | | | | |
|---|---|---|---|---|
| 2011/0304295 | A1* | 12/2011 | McNally | H01M 10/46 320/101 |
| 2015/0162784 | A1* | 6/2015 | Kydd | B60L 11/1811 307/9.1 |
| 2015/0367746 | A1* | 12/2015 | Maeno | B60K 35/00 701/22 |

* cited by examiner

*Primary Examiner* — Jared Fureman
*Assistant Examiner* — Duc M Pham

(57) ABSTRACT

This invention is a DC-coupled, non grid-tied system comprising a solar panel, or an array of panels, a storage battery, a battery charger, an inverter, and optionally, a connection to an electric vehicle via both the regular AC charging connection and a DC connection. Unlike conventional grid-tied solar systems there is no possibility of solar or battery energy being fed back to the grid by virtue of the one-directional flow of energy through the battery chargers. The system can utilize all of the energy produced by the solar panels to provide power to critical household loads by storing electric energy in the storage battery. In the event of a grid outage, the system maintains power to the critical loads to the limits of the capacity of the batteries and the inverter, supplemented by whatever solar power is available. The energy available in an outage can be supplemented by using the main propulsion battery of an electric vehicle. The DC connection to the electric vehicle can be either indirect through the low voltage accessory system of the vehicle or direct through a high voltage quick charge port on the vehicle.

8 Claims, 4 Drawing Sheets

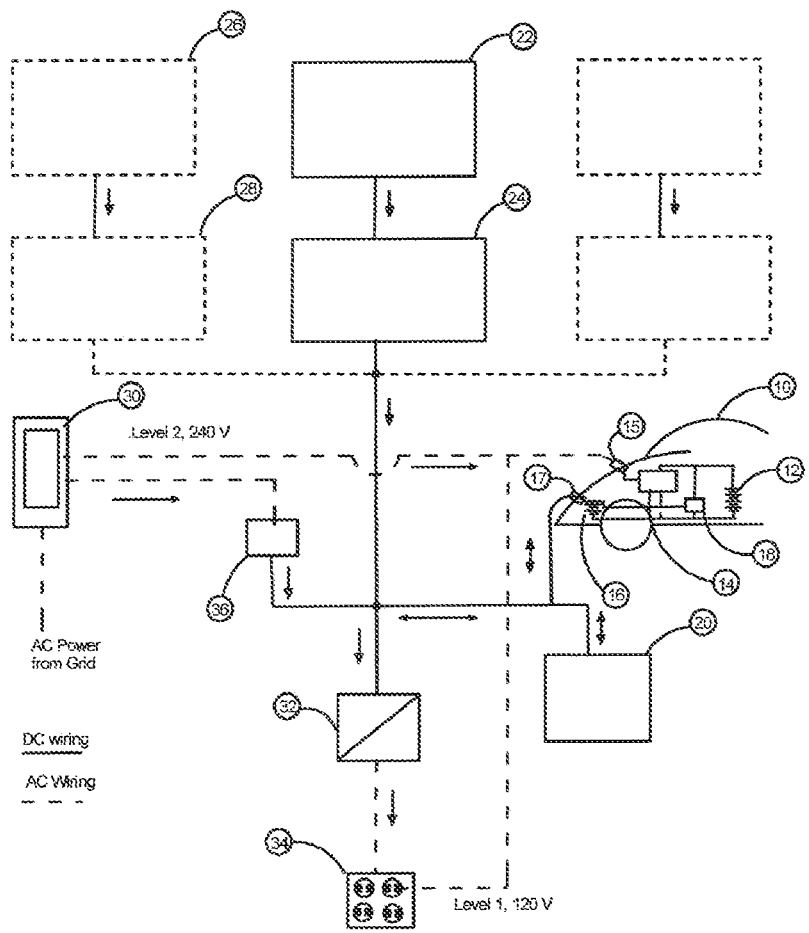

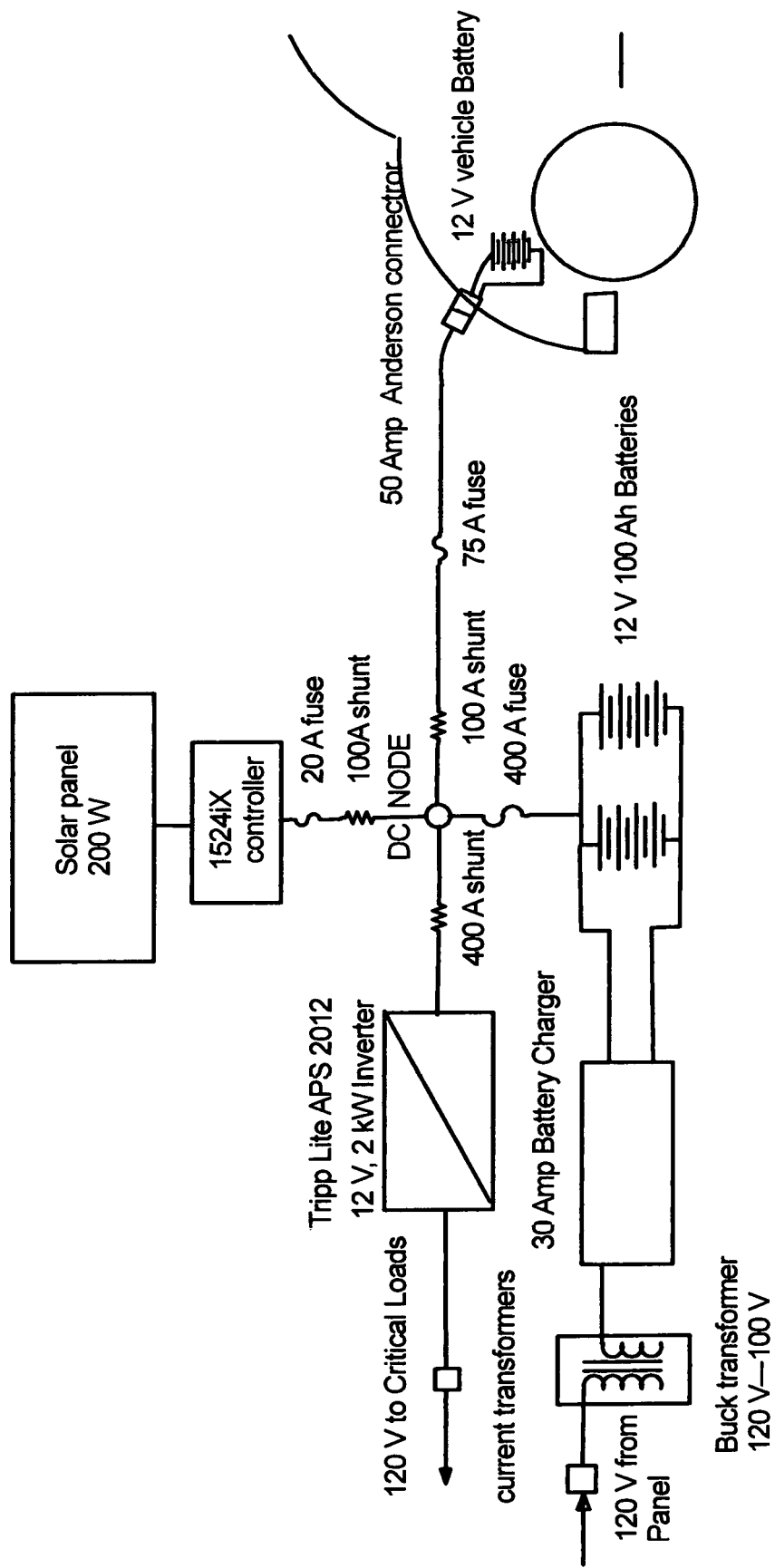

NON GRID-TIED VEHICLE-SOLAR UNINTERRUPTABLE POWER SYSTEM

CROSS-REFERENCE TO RELATED APPLICATIONS

This application is related to U.S. patent application "Vehicle-Solar-Grid Integration" Ser. No. 14/101,423 filed Dec. 10, 2013, now issued as U.S. Pat. No. 9,566,867, Feb. 14, 2017, by the present inventor, and Provisional Patent Applications "Bidirectional Power Electronic Interface" No. 61/889,067, filed Oct. 10, 2013, "Bidirectional Power Electronic Interface with Sustaining Power" 61/921,583, filed Dec. 30, 2013, "Vehicle-Solar-Grid Integration with Supplementary Battery" 62/050,819, filed Sep. 16, 2014, and "Low-Cost EVPV for Vehicle-Solar-Grid Integration", 62/297,462, filed Feb. 19, 2016, "Minimum Cost EVPV for Vehicle-Solar-Grid Integration" 62/299,756, filed Feb. 25, 2016, later filed as nonprovisional patent application Ser. No. 15/441,484, Feb. 24, 2017, and "Vehicle-Solar-Grid Integration for Back up Power" 62/465,424 filed Mar. 1, 2017 by the present inventor now filed as a patent application and "Multiple Load Micro-Grid Implementation of Vehicle-Solar-Grid Integration" 62/320,701, filed Apr. 11, 2016, by The Present Inventor and Brian R. Hamilton of Cranbury, N.J., and Chris A. Martin of Media, Pa. This application claims priority in light of Provisional Patent Application "Non Grid-tied Vehicle-Solar Uninterruptable Power System" 62/544,041, filed Aug. 11, 2017, by the present inventor and incorporated herein verbatim.

(Underlined material added Aug. 2-6, 2018 by P.H. Kydd)

FEDERALLY SPONSORED RESEARCH

None

CITED LITERATURE

SAE J-1772 revised October 2012, p 32.
IEEE Standard 1547 Net metering interconnection to the grid General Electric data on energy consumption of 21 to 28 cu ft. refrigerator-freezers.
Pika Energy Island brochure, pika-energy.com
U.S. Pat. No. 6,847,937, Belehradeb, Jan. 25, 2005
U.S. Pat. No. 8,575,780, Barlock, Jul. 24, 2012
And Applications 2013/0020,873, and 2010/0019,577
U.S. Pat. No. 8,575,780, Moon, Nov. 5, 2013
U.S. Pat. No. 8,599,587, Chapman, Dec. 3, 2013
U.S. Pat. No. 8,716,891, Choi, May 6, 2014
U.S. Pat. No. 8,957,547, Chang et al, Feb. 17, 2015
U.S. Pat. No. 9,263,895, Naiknaware et al, Feb. 16, 2016
U.S. Pat. No. 9,276,410, Binder et al,
U.S. Pat. No. 9,293,948, Freitas, R. J. et al, Mar. 22, 2016
U.S. Pat. No. 9,705,333 Clifton, E.D.
US Patent Applications 2009/0179,495 Jul. 16, 2019, and 2008/0111,424, May 5, 2008, Yeh

BACKGROUND OF THE INVENTION

There is a need for a solar photovoltaic installation which can provide low cost power during normal times and emergency power during power outages on the grid which is not tied directly to the grid. Grid-tied solar inverters are required to shut down during grid outages, per IEEE Standard 1547, to prevent solar power from feeding back onto a downed line and endangering utility personnel trying to fix the problem. Thus the grid-tied solar installation is compelled to shut down just when its power is most needed. The only available alternatives are multi port inverter systems, such as those supplied by Princeton Power Systems, Ideal Power or Pika Energy or battery-supported back up systems such as the Sunny Island system of SMA, and Magnum Energy Systems, both of which are quite expensive.

There is another problem with conventional grid-tied solar systems in that the utilities are beginning to disfavor them as a threat to their business and a destabilizing element in the grid. Grid-tied solar systems can inject power at any time, and their output is uncontrollable and highly variable. As a result consumers who want the benefits of solar energy are not able to obtain permits to net meter from their local Electric Distribution Company (EDC), and without net metering, solar systems sized to deliver more power than the household can use are uneconomic.

There is yet another problem in that owners of battery storage systems who can ride through outages with their solar energy intact and who could provide ancillary frequency and voltage regulation services to the grid by taking and returning power from the battery are forbidden to do so by rules specifying that only "renewable" energy may be net metered, and that energy stored in the battery may not be "injected" into the grid.

There is the further problem that battery storage in the amount necessary to provide useable emergency power in an outage lasting more than an hour or so is very expensive. A typical household consumes electric energy at the average rate of 1 kW and a 24 kWh battery to last one day will cost approximately $10,000.

It is an objective of this invention to provide an inexpensive, non-grid-tied solar system with storage that can provide low-cost solar power to critical household loads during normal times and emergency power throughout power outages of whatever duration. The system relies on an electric vehicle main propulsion battery to supply massive storage capacity without the necessity for investing in a major fixed storage battery. The system can be installed without a net meter connection to the local EDC or any other special permits, as long as local electrical codes are complied with. It can even provide regulation service without "Injection".

BRIEF SUMMARY OF THE INVENTION

The objectives of this invention are obtained by supplying critical household loads such as refrigeration, microwave cooking and emergency lighting from a deep-cycle battery with a capacity to support the critical loads only for approximately twenty hours. The battery current is inverted to supply the critical load receptacles with AC power. The AC power can also be used to recharge an electric vehicle battery via the normal J-1772 plug at the 120 V, Level 1 rate.

The battery is kept charged by one or more solar panels equipped with battery charge controllers. The solar array is sized to support the critical loads on a bright summer day including the EV charger if connected. The solar power is supplemented by grid power via a conventional AC battery charger at night and on cloudy winter days.

The battery storage can be supplemented for long grid outages by connecting an electric vehicle to the uninterruptable power system both by an AC power connection to charge the vehicle battery and by a DC power connection that can take energy from the battery. Because the AC connection is one-way only for both the stationary charger and the vehicle charger, the chargers act to isolate the system from the grid, allowing it to use AC power but never feed it back.

In this way the system can use grid power to supplement solar power to keep the vehicle charged and maintain critical household services such as refrigeration, microwave cooking, and essential lighting as long as grid power is available. In the event of an outage, the stationary battery and the vehicle battery provide significant capacity to maintain critical services overnight and through cloudy weather, while allowing whatever solar energy is generated to replenish the battery and maintain services indefinitely.

The system is self-contained, does not require a separate connection to the grid and requires only minimal rewiring of a single receptacle or a very few critical loads. The result will have no impact on the local EDC except a minimal load loss equivalent to the amount of solar energy generated each month. The result should be minimal or no expense and delay involved in system engineering, permitting and utility interaction. This also eliminates a major cost of installation. In smaller sizes such as 200 to 1000 Watts solar, the system can be preassembled and installed as a factory-made unit for minimum cost.

BRIEF DESCRIPTION OF THE DRAWINGS

FIG. 2A. shows a high voltage DC connection to the vehicle directly via a quick charge port on the vehicle.

FIG. 3 shows the details of the cited example.

DETAILED DESCRIPTION OF THE INVENTION: THE PREFERRED EMBODIMENT

Figure 1:
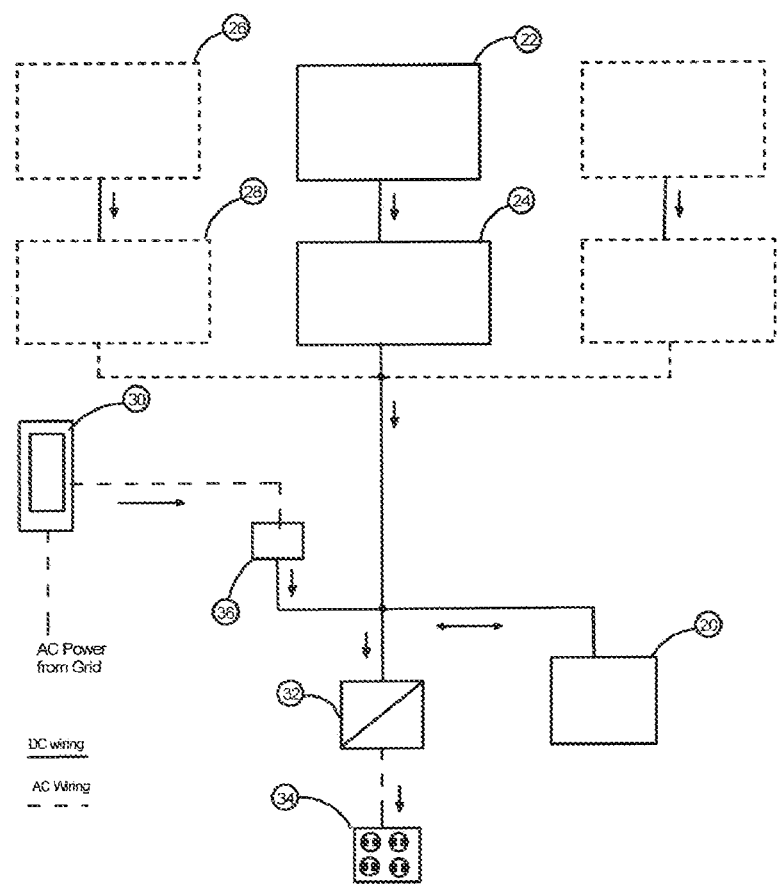
FIG. 1 is a schematic diagram of the invention showing the solar array feeding DC power to the stationary battery and the inverter powering the critical loads. The solar power is supplemented as needed by grid power through a battery charger.

FIG. 1 shows stationary deep cycle battery 20, which may be an AGM lead acid battery or a lithium-ion battery, providing a bidirectional flow of DC power to and from a central node. The node is also connected to solar panel 22 through battery charge controller 24, which supplies DC power to recharge battery 20. Panel 22 and charge controller 24 may be supplemented by additional panels in parallel 26 and 28, etc. The solar array should be sized to supply no more that the average use of the critical loads, roughly 100 watts for a refrigerator-freezer for example. (General Electric Energy Star data on consumption of 21 cu ft. to 28 cu ft. refrigerator freezers, 76 to 101 Watts). Microwave cooking may add 10 to 20 Watts for a total of 120 Watts. Solar systems at 40 degrees North typically produce approximately 5 hours of nameplate rating in mid summer on average (NREL insolation maps). The maximum on a cloudless day will be closer to 8 hours To avoid overcharging battery 20, a solar rating of up to 360 Watts for eight hours will support 24 hours of 120 Watt load with minimal demands on grid power for recharging.

Solar array 22 is supplemented by grid power through main distribution panel 30 and battery charger 36. Battery charger 36 needs to have enough capacity to maintain the critical loads on completely sunless winter days, namely 10 Amps at 12 V.

With this arrangement critical loads 34 are supported and battery 20 is kept charged by solar array 22 at the maximum that the solar array can produce with little or no waste. The battery capacity needed to accomplish this is 2 kWh to support 120 Watts during the 16 hours of minimal solar production at night.

Inverter 32 takes DC power from battery 20 to supply critical load receptacles 34. While the average power is quite low at 120 W, the instantaneous power draw can be quite high at 1750 W for a microwave and 2400 W starting load on a big refrigerator freezer. Inverter 32 should be sized at 2000 W continuous and 3000 to 4000 W peak. The maximum battery draw will be at roughly the 1.0 C rate (Amps drawn equal to Amp-hour rating), which is high but acceptable.

The non grid-tied function is indicated by the direction of the arrows. DC power flows from the solar panels through the solar charge controller to the node. AC power flows from panel 34 through battery charger 36 then as DC power to the node, and from inverter 32 to critical load receptacles 34. The only bidirectional power flow is from and to Battery 20. Power cannot flow back trough battery charger 36 to the grid.

Figure 2:
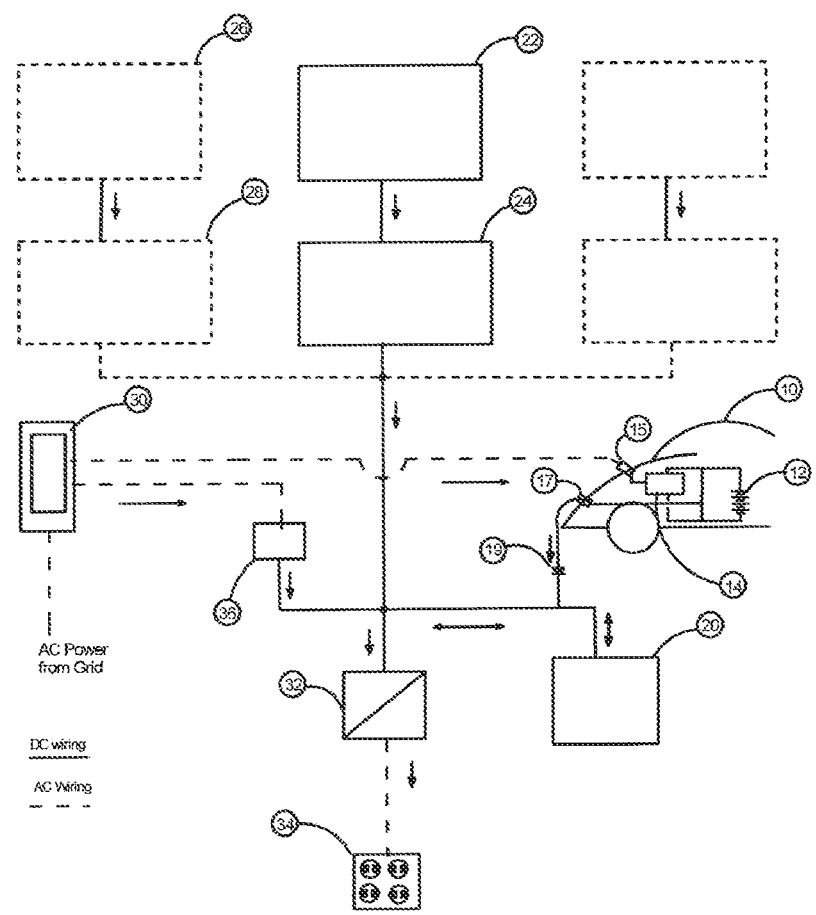
FIG. 2 shows connections to an Electric Vehicle to supplement the stationary battery. AC power is fed to the EV to keep its main propulsion battery charged. DC power is taken from the vehicle auxiliary 12 V system to keep the stationary battery charged for greater duration during outages and during periods of inadequate solar energy.

FIG. 2 shows the system of FIG. 1 supplemented by connection to the much larger storage battery 12 in an electric vehicle 10 to embody the enhanced electric energy storage concept of this invention. The connection is twofold. During normal operation, the vehicle is recharged from the grid with AC power to the main propulsion battery 12 through on-board charger 14 via J-1772 connector 15. Typically this connection will be at J-1772 Level 2, 240 V, and up to 10 kW AC. When needed during a prolonged outage, a separate DC connection is made to recharge battery 20 from the vehicle. In this case the connection is through the 12 V accessory system via plug 17, which could be an Anderson 50 Amp connector. Plug 17 connects to on board 12 V battery 16, which is recharged via DC-DC converter 18 from main propulsion battery 12 when the vehicle is in the "on" condition. Solar array 22 can recharge battery 20 and accessory battery 16 through this connection.

Main propulsion battery 12 may also be charged by the solar array through receptacles 34. This is accomplished by plugging J-1772 level 1 connector into the vehicle and into the critical load receptacles when there is ample solar energy and driving is more important than cooking during a prolonged outage as shown in FIG. 2.

In an outage the endurance of the system is limited to the energy stored in the vehicle battery. This is substantial, however, and getting more so with the advent of 200 mile range vehicles with 60 kWh main propulsion batteries 12. In a system with a 120 W continuous load and periodic 1-2 kW starting loads the system can be expected to operate up to eight days even when based on a vehicle battery with only 24 kWh capacity.

Tapping the vehicle battery capacity via the 12 V accessory system is somewhat marginal in that the capacity of DC-DC converter 18 is limited, and on-board 12 V battery 16 is also marginal, since it is not required to deliver much electric energy. The future is expected to see an evolution to 48 V accessory systems on vehicles for better performance with lower currents and smaller wires. Feeding the full 2 kW capacity of inverter 32 will take a current of 167 Amps at 12 V and the 4 kW surge capability will take 333 Amps. At 48 V these current drop to 42 and 83 Amps respectively. The advantage of connecting through the accessory system is that all vehicles have one and the connection can be a simple, universal plug or even a pair of alligator clips.

OTHER EMBODIMENTS

A better solution is shown in FIG. 2A in which the DC connection is made directly to the main propulsion battery 12 via the quick charge port 17. Now the power capability of the DC connection is virtually unlimited, since the quick charge port is capable of 50 kW or more, and the battery can accept and deliver power at hundreds of kW. In addition, unlike the accessory battery connection, the quick charge port is bidirectional so that the solar array can charge the vehicle, turning the system into a nanogrid with its own generation and storage.

The vehicle battery can also provide regulation services to the local critical load circuit. It can provide power to the critical loads when the grid is short and take power to recharge when the grid is in excess, still with no actual injection of power into the grid, only a lessening of the load.

A possible problem with this scenario is that charging EV main propulsion batteries is a critical operation, particularly as they get near full charge. Vehicle chargers are carefully designed to avoid damage to the very expensive propulsion battery. Uncontrolled charging could damage the battery and void the warranty. For Japanese vehicles with CHAdeMO quick charge ports, there is a protocol for a bidirectional connection. For other vehicles, a diode 19 should be used to avoid uncontrolled charging.

The closest approach to this invention is disclosed in Chang, U.S. Pat. No. 8,957,547 and Patent Application 2013/0169,051. This invention, which is similar to the DC bus system being sold by Pika Energy, envisions a DC bus, which connects a solar array, an AC charger, and a battery to a load. By connecting through a DC bus Chang isolates the solar system from the grid and achieves the objective of non-injection. He does not envision an electric vehicle as the major battery storage. Chapman in U.S. Pat. No. 8,599,587 discloses a system similar to Chang.

Most similar systems with solar power and battery storage have no isolation between the solar system and the grid or are intentionally bidirectional. Examples of the former are U.S. Pat. No. 6,847,130, Belehradeb, U.S. Pat. No. 8,716,891, Choi, U.S. Pat. No. 9,263,895, Naikaware, U.S. Pat. No. 9,276,410, Binder, et al, U.S. Pat. No. 9,293,948 Freitas. Examples of intentionally bidirectional systems are: U.S. Pat. No. 8,227,937, Bailock, U.S. Pat. No. 8,575,780, Moon, and U.S. Pat. No. 9,705,333, Clifton. Patent Applications 2009/0179,495 and 2008/0111,424, by Yeh, disclose a system in which a solar array is connected to an uninterruptible power supply which feeds a load, similar to Chang, but with no vehicle.

EXAMPLE

An installation similar to FIG. 2 has been built and tested. The basic components of the installation are shown schematically in FIG. 3 along with instrumentation inputs to permit measurement of key operating parameters. A single 200 Watt 36 Volt solar panel provided 12 V power through a Solar Boost 154i battery charge controller to the DC node. A 20 Amp fuse and a 100 Amp/50 MV shunt provided safety and measurement of solar input.

120 V AC power from a sub panel in the Penn State University GridSTAR Solar Training Center at the Philadelphia Navy Yard was fed to the 30 Amp. battery charger, which was connected to the node through a 400 A, 50 mV shunt. The charger was a simple rectifier, which put out a voltage higher than the solar system. To allow the solar system to contribute, the charger input voltage was reduced by 20% through a buck transformer. The charger input was monitored by an AC current transformer putting out 5 V DC at 10 Amps AC.

The charger was connected direct to the 200 Ah battery pack comprising two group 24 Lifeline AGM lead-acid batteries in parallel. The batteries were in turn connected to the DC node through a 400 A fuse. At 2 kW the inverter is drawing 167 Amps and at 4 kW peak it is 333 A. If and when vehicles go to 48 V accessory systems, these huge currents can come down and the stationary battery voltage can be raised to 48 V, making a much better system.

Finally, provision was made to connect the node to the 12 VDC accessory battery of a Nissan Leaf. This was done with a 150 A Anderson plug in anticipation of very heavy 1 kW, 80 A loads. In fact the load was much less, and a 50 A rated plug could have been used. At the sacrifice of elegance, a simple set of battery clips could have been used, since the vehicle connection does not need to be made immediately during an outage. The vehicle is simply there to extend the use of the stationary battery. Power from the vehicle was monitored by a 100 A/50 mV shunt and protected by 75 Amp fuses.

Results

The data from the various shunts and current transformers were recorded by an Agilent 34970A data logger with a 34901A, 20 Channel multiplexer. The data were stored on a Dell 1000 laptop for display and printing.

The load was provided by a Crouzet Millenium 3 programmable logic controller controlling a 1400 W heat gun, simulating the starting current for a refrigerator or operation of a microwave oven, and two 250 W heat lamps in parallel, simulating the operation of the refrigerator or a pump or heating system fan. The PLC was programmed to impose a 1 minute spike of 1400 W followed by 12 minutes of 500 W operation every hour of the day. In addition a 60 W light bulb simulating emergency lighting was on continuously, a total of 185 W average load.

A test on Oct. 25, 2017, started at 10 AM recharging the battery both by solar energy starting at 8.8 A, 12 V, 106 W and the charger at 3.6 A, 120 V, 432 W. When the inverter was turned on manually, the battery voltage rose steadily from 12.25 V rest voltage, 13 V charging voltage, to 13.4 charging voltage. At that time the charger was turned off simulating a grid outage. The battery connected to the vehicle 12 V accessory battery supported the first load cycle at 11 AM. The accessory battery supplied only 2 Amps, but at the end of the load cycle the vehicle was turned on so that the main propulsion battery was recharging the accessory battery, and the contribution from the vehicle jumped briefly to 40 Amps then to 26 Amps, 12 V, 312 W. The system with the vehicle in support continued to support the load and the battery voltage continued to recover. When the battery reached 13.5 V the vehicle charger shut down by itself. When the battery voltage dropped to 12.6 V the vehicle turned on again, so the combined system will operate indefinitely without supervision.

The positive result of this run is that the vehicle can indeed extend the time during which the system can provide emergency back up power during an outage. A down side is that the vehicle must be "on" for the DC-DC converter to provide power from the main propulsion pack. Fortunately for the Leaf at least, it is possible to walk away with the electronic key and the vehicle will stay on. It is not necessary to leave the key in the vehicle. Someone could still drive the vehicle away so having it in a locked garage would still be desirable.

For a final test starting at 1 PM the charger was turned off and the system continued with decreasing solar input. Just before the 2 PM load interval the vehicle was plugged in and turned on. From this point the vehicle input matched the load satisfactorily. Before the "outage" the power flows with 500 and 1400 W loads were as follows:

| Load (Measured) | 480 W | 1200 W |
|---|---|---|
| Charger | 360 W | 480 W |
| Solar | 60 W | 120 W |
| Vehicle | 480 W | 600 W |
| Total input | 900 W | 1200 W |
| Efficiency | 53% | 100% |

CONCLUSIONS

The back up power system is functional and will support the type of critical load typically encountered in a residence to provide for continuing food preservation, microwave cooking, gas or oil heating, water pumping and minimal lighting. With a larger 1 kW solar array it could provide for minimal EV charging to provide some mobility and to recharge the vehicle batteries in an extended outage. The components of the system are not unduly expensive relative to alternative means of providing equivalent back up power. An engine-driven generator capable of 4 kW peak costs roughly $2000, the same as a 200 W continuous 4 kW peak system of this invention. The system will smoothly maintain the load in an outage and automatically accept resumption of grid power afterwards.

The system can be supported by a link to the accessory battery of an Electric Vehicle, which can be a simple as a set of jumper cables. The vehicle can provide power from its main propulsion battery via the DC-DC converter to the Accessory battery when the vehicle is "on". The vehicle will automatically provide power when needed and shut off when not.

The efficiency of the system is quite good under full load, but less so when lightly loaded. The inefficiency is primarily due to the Charger, which is still providing too high a voltage. A charger designed for this application should solve this problem This system with a solar array supported by storage can improve the efficiency of solar PV generation by storing excess energy during the day and making it available at night. The storage feature recreates the advantage of net metering in that all of the solar energy is used, regardless of the time match between insolation and electric demand. The same feature allows the system to serve loads much larger than the capacity of the solar array, such as the starting current of a refrigerator or circulating fan.

The performance of the system is sufficiently attractive that it has been relocated for an extended beta test at a residence.

The invention claimed is:

1. A system comprising,
   a storage battery to store DC electric energy connected to a DC node, which in turn is connected to,
   an inverter to convert DC electric energy from said storage battery to AC electric energy to provide uninterrupted electrical power to critical loads supplied by one or more electrical service panels and receptacles,
   a battery charger to recharge said storage battery from an electric power grid supplying AC electric energy, said battery charger being the sole connection between the system and the grid through which by virtue of the one-way design of the charger there is no possibility of electric energy being fed back to the grid from the DC node,
   a solar panel and battery charge controller or an array of said panels and battery charge controllers, said panels or array being sized to provide the average electric energy demand of the critical loads, and
   a DC connection to a storage battery of an Electric Vehicle to supplement the energy storage capacity of said system storage battery.

2. The system in claim 1 in which an Electric Vehicle is connected to the system by both AC and DC circuits such that the AC circuit recharges an Electric Vehicle traction battery by an on-board Electric Vehicle Battery charger and the DC circuit supplements the energy storage capacity of said system storage battery in which there is no possibility of vehicle battery energy being fed back to the grid due to the one-way nature of said on-board Electric Vehicle battery charger.

3. The system in claim 1 in which the DC connection is made to a low-voltage accessory battery of the vehicle which is recharged via a DC-DC converter from a high-voltage, high-capacity traction battery of the vehicle.

4. The system in claim 1 in which the DC connection is made directly to a traction battery of the Electric Vehicle through a high-voltage quick-charge port of the vehicle conforming to the CHAdeMO, SAE CCS, or other DC quick-charge protocol.

5. The system in claim 2 in which the AC connection to the vehicle is compliant with the SAE J-1772 level 1 120 V AC standard.

6. The system in claim 2 in which the AC and DC connections are made simultaneously via an SAE CCS plug and receptacle.

7. The system in claim 2 in which the AC and DC connections are made sequentially, as by the Supercharger Connection protocol of Tesla Motors, the J-1772 level2 AC/level 1 DC protocol of the SAE, or the like.

8. The system in claim 1 in which only a bidirectional DC connection is made directly to a traction battery of said Electric Vehicle so as to provide additional electric energy at the traction battery voltage to support said critical loads through said inverter, and to recharge both said vehicle battery as well as the system stationary battery by the system battery charger at the traction battery voltage.

* * * * *